Figure 1:
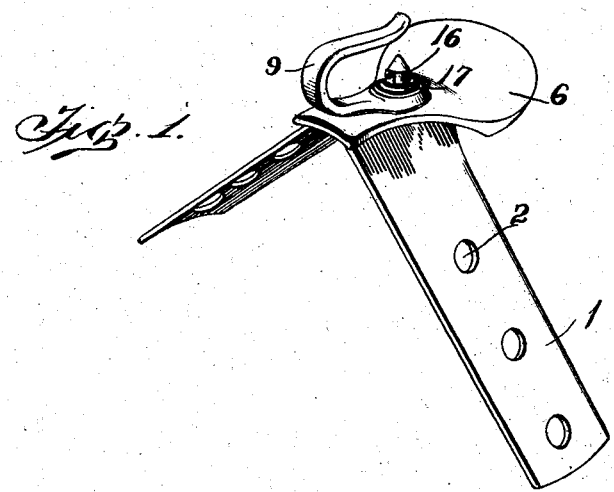

No. 730,122. PATENTED JUNE 2, 1903.
C. HOBERECHT.
HARNESS SADDLE.
APPLICATION FILED AUG. 27, 1902.
NO MODEL.

Witnesses
L. G. Handy
R. B. Cavanagh

Inventor
Charles Hoberecht
By
Mason, Fenwick & Lawrence,
Attorneys

No. 730,122. Patented June 2, 1903.

UNITED STATES PATENT OFFICE.

CHARLES HOBERECHT, OF SEDALIA, MISSOURI.

HARNESS-SADDLE.

SPECIFICATION forming part of Letters Patent No. 730,122, dated June 2, 1903.

Application filed August 27, 1902. Serial No. 121,249. (No model.)

*To all whom it may concern:*

Be it known that I, CHARLES HOBERECHT, a citizen of the United States, residing at Sedalia, in the county of Pettis and State of Missouri, have invented certain new and useful Improvements in Harness-Saddles; and I do hereby declare the following to be a full, clear, and exact description of the invention, such as will enable others skilled in the art to which it appertains to make and use the same.

This invention relates to certain new and useful improvements in saddlery, and has particular application to the tree-plate, gig-seat, and the check-hook, these portions forming what is commonly known as the "harness-saddle."

The object of the invention is to provide a check-hook which by its peculiar construction is of maximum strength and durability and which may be used either on single or double harness.

The invention contemplates a check-hook of a form whereby the necessity of forming holes in the center of the tree is obviated and the use of all bolts, nuts, screws, rivets, and taps protruding through the bottom of the tree is dispensed with.

It is also the intention of the present invention to provide a structure of harness-saddle with a check-hook or gig-seat which may be applied to the harness while the same is in position on the animal.

A further object of the invention is to provide a harness-hook and a gig-seat which is adapted to be fastened to the gig or harness tree in such manner that the possibility of the same working loose from said tree is removed.

Another object is to devise a structure which shall be simple in construction, easily placed in operative position, one which is durable, and capable of being manufactured at but small expense.

To this end the invention consists in a gig or pad tree having a polygonal stud or post cast integral therewith and provided with an orifice or cavity threaded for the reception of a set-screw.

It further consists in a check or post hook having an enlarged base portion, a spur or protuberance formed on the under side of the said base portion, and a polygonal aperture also formed in said base portion, such orifice or aperture being adapted to receive the aforementioned stud formed on the gig-tree or pad-plate.

It also consists in a gig-saddle having a saddle-plate provided with suitable apertures and adapted to be clamped by a suitable screw between the check-hook and the tree.

It further consists in certain other novel constructions, combinations, and arrangements of parts, as will be hereinafter fully set forth and claimed and which are illustrated in the accompanying drawings.

While I have herein shown my preferred form of gig-saddle, it will of course be understood that there can be modification in the proportion and minor details of construction without departing from the spirit of the invention or sacrificing any of the advantages thereof.

Figure 2:
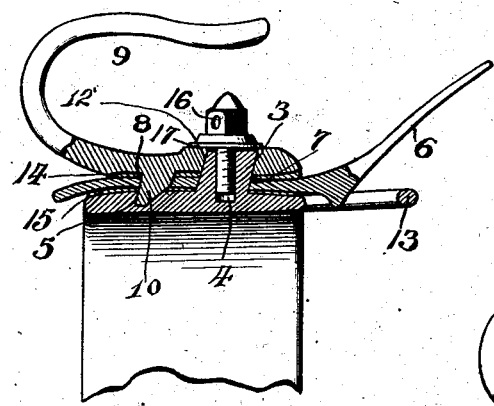
Figure 3:
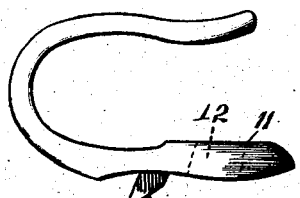
Figure 4:
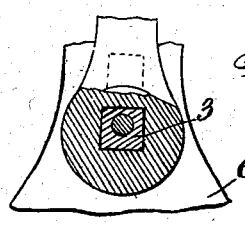

In the accompanying drawings, wherein my invention is delineated, Figure 1 is a perspective view of a structure embodying my invention. Fig. 2 is a central vertical sectional view of the device illustrated in Fig. 1. Fig. 3 is an enlarged view of my improved check-hook. Fig. 4 is a detail horizontal sectional view through the stud projecting upwardly from the ridge-plate.

Referring now to the drawings in detail, and in particular to Fig. 1, the numeral 1 designates the ridge-plate or gig-tree provided with apertures, as at 2, for the ordinary purposes well understood. This gig-tree is further constructed with a stud or plug, as shown at 3 in Fig. 2, such stud being inclined slightly to the rear and being centrally bored or apertured, as at 4, for the reception of a suitable screw. The interior wall of the bored-out portion of the polygonal stud is screw-threaded in the ordinary manner. Directly in front of the stud on the tree the latter is cut away or apertured, as at 5, for a purpose to be hereinafter mentioned. This cut-out portion is preferably formed on a bevel or inclination. Upon the gig-tree is designed to be placed the saddle-plate 6, which is provided with apertures, as at 7 and 8, the former permitting the passage of the stud 3 through the saddle-plate, and the latter or aperture 8, which is smaller than the aperture 7, is adapted to be placed in alinement and caused to register with the orifice 5 in the gig-tree. After the saddle-plate has been placed on the tree, as described, the bolt-hook is then placed in position. This hook, which I have designated as a whole by 9, has formed or cast integral therewith on its under side an inclined spur or projection 10. The hook has an enlarged base portion, as at 11, which is apertured, as at 12. When the bolt-hook is mounted in position, the spur 10 passes through the front registering orifices of the tree and saddle-plate, while the aperture 12 permits the passage of the stud 3. A set-screw formed with a polygonal shoulder and an aperture through the same for the reception of an operating-tool is then socketed in the polygonal stud 3, thus binding the entire structure firmly together. The tree is of course provided with the ordinary back loop 13. The set-screw 16, which secures the parts together, is preferably provided with an annular flange 17, which when the set-screw has been threaded into position rests upon the top of the enlarged portion 11 of the hook 9.

While I have herein shown a gig-saddle adapted for use on a single harness, it will of course be understood that the same is adapted for use on a double harness as well.

The many advantages incident to my improved construction are so evident that it is unnecessary to dwell upon the same in detail. The absence of any nuts, rivets, or projections on the under side of the tree renders the use of my invention particularly desirable, inasmuch as there is no chafing on the backs of the animals. Furthermore, the construction described presents a very rigid and strong gig-saddle or harness-pad and one which is extremely simple, yet presents no liability of accidental separating of the parts.

Having thus fully described my invention, what I claim as new, and desire to secure by Letters Patent, is—

1. A harness-saddle of the class described, comprising in its construction a gig-tree or pad-plate imperforate at its central portion, a polygonal stud formed on the upper surface thereof, said tree having a recess formed in the upper surface thereof adjacent to the stud, a saddle-plate provided with a plurality of orifices, one permitting the passage of the stud of the tree through the plate, and another registering with the recess in the tree, a check-hook adapted to rest upon the saddle-plate, a stud on said hook for engaging the recess in the tree, and means engaging with the stud of the tree for securing the parts together, substantially as described.

2. A harness-saddle of the class described, comprising in its construction a gig-tree or pad-plate, a polygonal stud formed thereon, said tree having a recess formed in its surface adjacent to said stud, a saddle-plate adapted to rest upon said tree, such plate being provided with apertures, one permitting the passage of the stud of the tree and the other registering with the recess in the tree, a check-hook having an enlarged base portion, such base portion having a polygonal aperture therein for the passage of the stud of the tree, and a projection or spur formed on the under side of the said hook and designed to be socketed in the recess in the tree, substantially as described.

3. A harness-saddle of the class described, comprising a gig-tree or pad-plate, a polygonal stud formed thereon and having its central portion bored vertically and threaded, said tree having a recess formed in its upper surface adjacent to said stud, a saddle-plate provided with apertures adapted to be positioned on said tree, a check-hook having an enlarged base portion, such base portion being provided with a polygonal aperture for receiving the polygonal stud of the tree, a spur formed on the under side of the hook and designed to pass through one of the orifices of the saddle-plate and be socketed in the recess of the tree, and a set-screw threaded in the bored-out portion of said stud for securing the parts together, substantially as described.

4. A harness-saddle of the class described, comprising a gig-tree an inclined stud formed thereon, such stud having its central portion bored vertically, said tree having a recess formed adjacent to said stud, the walls forming the recess being inclined, a saddle-plate having apertures adapted to be positioned on said tree, a check-hook having an enlarged base portion, such base portion being provided with an aperture shaped to receive the stud of the tree, an inclined beveled spur formed on the under side of the hood and designed to pass through one of the apertures of the saddle-plate and be socketed in the recess of the tree, and a set-screw threaded into the bored-out portion of the stud for securing the parts together, substantially as described.

5. A harness-saddle comprising a ridge-plate having a smooth and unbroken under surface and a recess in its upper surface, a stud projecting upwardly therefrom, a saddle-plate provided with apertures, one of which fits over said stud, a check-hook mounted upon the saddle-plate and provided with a lug or projection adapted to extend through the second aperture in the saddle-plate and engaging the said recess in the ridge-plate, and means for clamping the check-hook upon the saddle-plate, said means engaging the stud projecting upwardly from the ridge-plate, substantially as described.

In testimony whereof I hereunto affix my signature in presence of two witnesses.

CHARLES HOBERECHT.

Witnesses:
C. E. BAKER,
E. T. LEFTWICKS.